UNITED STATES PATENT OFFICE.

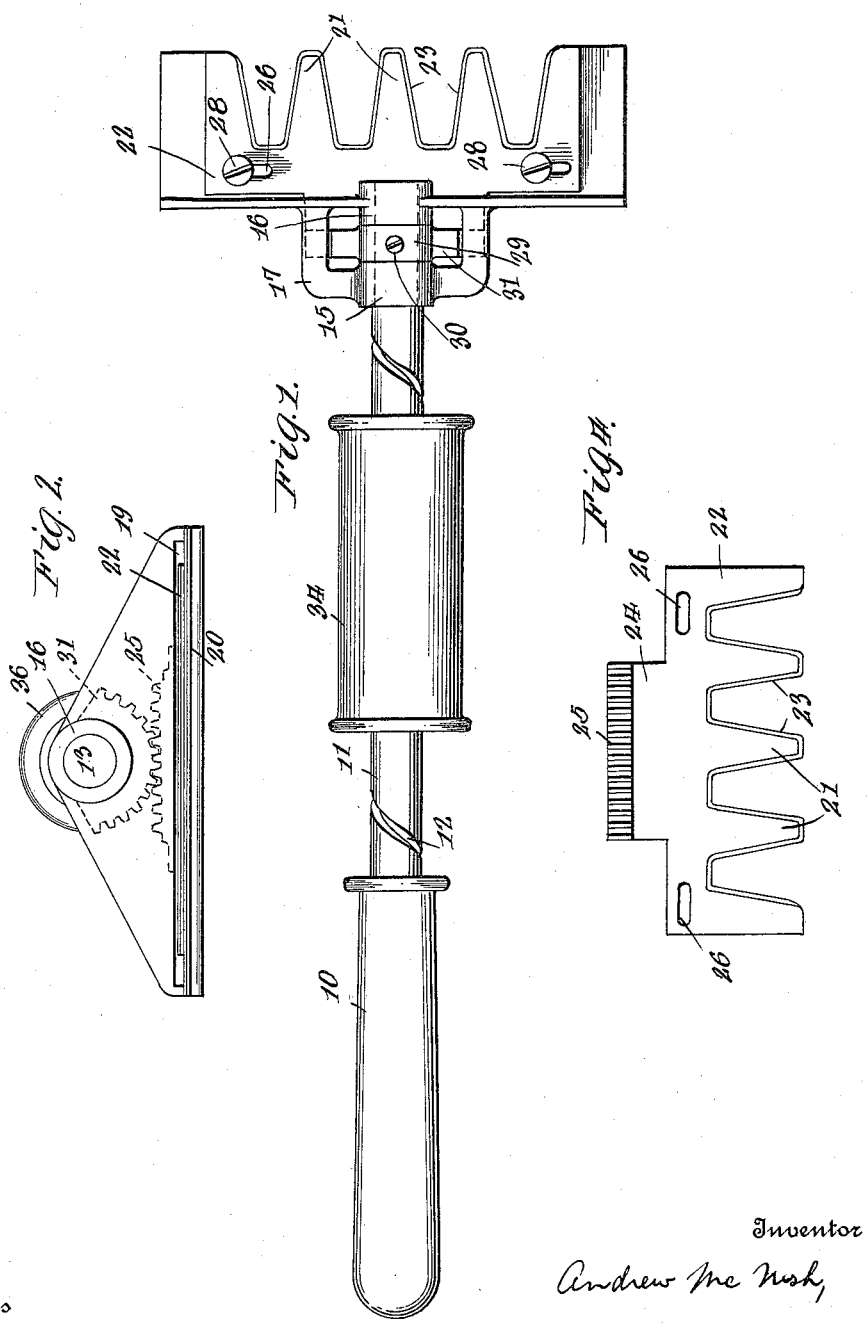

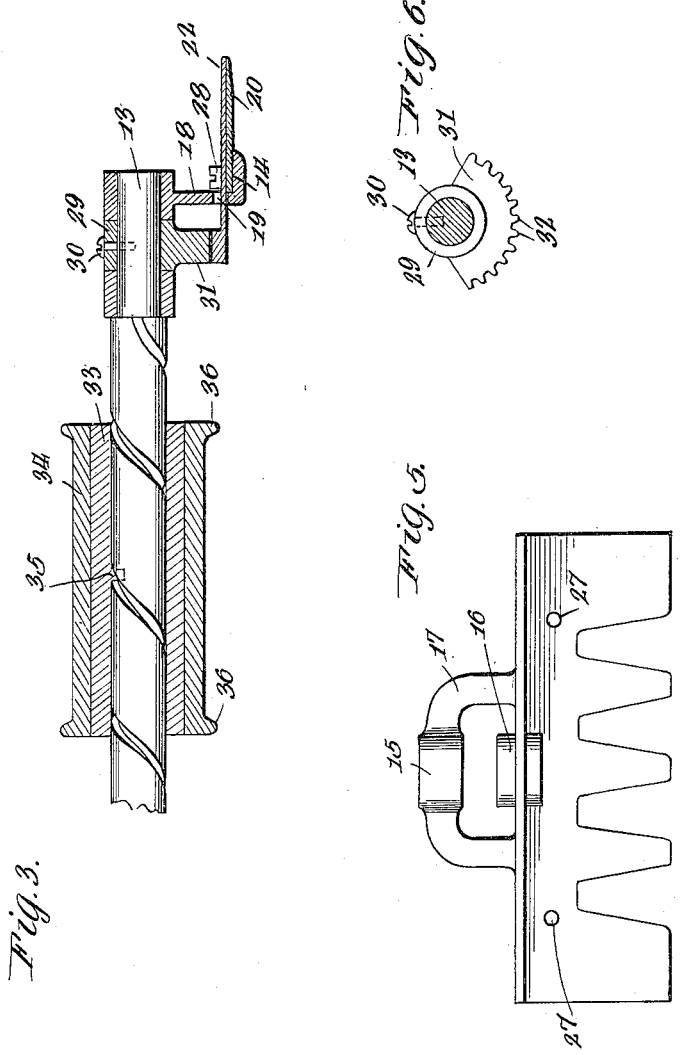

ANDREW McNISH, OF NEW SUFFOLK, NEW YORK.

TRIMMER.

1,154,789.

Specification of Letters Patent.

Patented Sept. 28, 1915.

Application filed June 13, 1913. Serial No. 773,501.

*To all whom it may concern:*

Be it known that I, ANDREW McNISH, a citizen of the United States, residing at New Suffolk, in the county of Suffolk and State of New York, have invented certain new and useful Improvements in Trimmers, of which the following is a specification.

This invention relates to trimmers and more particularly to portable manually operated trimmers adapted for trimming lawns, etc., and has for its primary object the provision of a simple and inexpensive device which will efficiently and effectually perform the functions which have heretofore been done by machines of a more complicated character.

Another object of the invention resides in the provision of a simple hand operated mechanism, which will oscillate the cutting blades for bringing about the desired result, by a simple operation which will be more fully hereinafter set forth.

Other objects as well as the nature, characteristic features and scope of my invention will be more readily understood from the following description taken in connection with the accompanying drawings and pointed out in the claims forming a part of this specification.

Referring to the drawings, Figure 1 is a plan view of the device constructed in accordance with my invention; Fig. 2 is a front elevation of the same; Fig. 3 is a detail fragmentary sectional view of the device; Fig. 4 is a detail top plan view of the cutter blade; Fig. 5 is a detail plan view of the stationary finger bar; and Fig. 6 is a cross sectional view of the shaft, showing to advantage the operating segment.

In the drawings wherein is shown the preferred form of my invention the numeral 10 represents a handle which has journaled therein the one end of the shaft or rod 11, said shaft being provided with a serpentine way or groove 12 which extends from the handle 10 to the reduced portion 13 of the shaft.

Mounted on the reduced portion 13 of the shaft 11 is a finger bar 14 which is provided with two sleeves 15 and 16 respectively, the sleeve 15 being situated midway the ends of the yoke member 17 which is secured to the rear side 18 of the finger bar, and in alinement with the sleeve 16 which is formed on the element 18 of the finger bar. The finger bar 14 is provided with an elongated slot 19 which is formed in the element 18 directly above the fingers 20. Extending through the elongated cut-out portion or slot 19 of the finger bar 14 are the blades or knife elements 21 of the cutter bar 22, the blades 21 being provided with sharpened marginal portions 23 as shown to advantage in Fig. 4. An extended portion 24 is formed on the rear edge of the cutter bar 22 and has formed thereon a rack bar 25, the function of which will be more fully hereinafter described. The cutter bar 22 has formed in proximity to the opposite ends thereof elongated slots 26 which are adapted for registering engagement with the apertures 27 of the finger bar 14, said cutter bar 22 being secured to the finger bar 14 through the medium of set-screws 28, or the like so as to allow for a free oscillatory movement of the cutter bar 22 over the finger bar 14, when power is applied through the rack bar 25.

Upon reference to Fig. 5 it will be seen that the sleeves 15 and 16 which are carried by the finger bar 14, are arranged in spaced relation to each other through the medium of the yoke member 17, heretofore fully described, so as to allow for the positioning of a sleeve 29 which is fixedly secured to the reduced portion 13 of the shaft 11 by a screw 30 or any other suitable detachable fastening means, the sleeve 29 being provided with a segment 31 which is arranged on the periphery thereof, the segment being provided with teeth 32 which normally engage in mesh with the teeth of the rack bar 25, as it will be seen that the sleeve 29 which is positioned between the sleeves 15 and 16 extends downwardly in parallelism to the element 13 of the finger bar 14, and into registering engagement with the rack bar 25 of the cutter bar 22.

Mounted for movement on the shaft 11, are the inner and outer sleeves 33 and 34 respectively, the inner sleeve 33 being preferably made of metal and provided with a stud or lug 35 which is integrally formed on the inner periphery and midway the ends thereof, for riding engagement in the serpentine way or groove 12 whereby to provide a spiral drive for oscillating the cutter bar 22 over the finger bar 14. The outer sleeve 34 is preferably formed of wood or an analogous material and has formed on the extreme ends thereof beads 36 so as to provide a suitable hand-hold for facilitating the actuation of the sleeve 33, for rotating the shaft 11 and imparting movement to the cutter bar 22.

My invention briefly contemplates, therefore, a suitable shaft made of metal or the like and provided with a spiral or serpentine way, which is engaged by the stud 35 of the sleeve 33 for rotating the shaft 11, which in turn imparts movement to the cutter bar 22 through the medium of the segment 31 and the rack bar 25, as above described. The cutter bar 22 being mounted to oscillate over the finger bar 14 in view of the elongated slots 26 which are engaged by the set-screws 28, the set-screws having the ends thereof rigidly secured in the aperture 27 of the finger bar 14. When it is desired to operate the device, the one hand of the operator engages the handle 10 of the device and the other hand engaging the sleeve 34 for reciprocating the same on the shaft 11, the operation of which will revolve said shaft for transmitting or intercommunicating motion to the cutter bar 22 in a manner heretofore fully described.

In the present instance the shaft 11 which is provided with the serpentine way or groove 12 entirely encircles said shaft a plurality of times so as to allow the handle 34 to be adjusted to any desired point on the shaft so as to facilitate the operating of the same at the option of the operator as it may be desired to arrange the operating element in proximity to the handle 10 so as to cause the element 34 to be engaged with the handle 10 when the operation of the cutter bar has been finished in one direction while the same will be limited in a counter direction by the provision of the slots 26 and screws 28. It may again be desired to arrange the operating element 34 in proximity to the yoke member 17 so as to especially adapt the device for persons having a long reach. The operating element 34 may be readily adjusted to the desired point on the shaft 11 by merely removing the screws 28 from their engagement in the slots 26 and after the desired point of adjustment has been attained the cutter bar again engaged with the finger bar as is obvious.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A trimmer including a handle, a shaft the one end of which is revolubly mounted in said handle, said shaft being provided with a serpentine way in the periphery thereof, and a reduced outer end, a finger bar, a sleeve formed on said finger bar and a yoke member carried by said finger bar, having an opening formed therein registering with the opening in said sleeve, a second sleeve fixedly carried on said reduced end between said sleeve and the opening in said yoke member, a segment formed on the outer periphery of said sleeve, a cutter bar mounted for oscillation on said finger bar and having the rear end thereof extended, a rack bar formed on said rear end for engagement with said segment, an elongated sleeve slidably mounted on said shaft and a stud formed on the inner periphery of said sleeve for engagement in said groove for rotating said shaft and imparting motion to said cutter bar.

2. A trimmer including a handle, a shaft the one end of which is revolubly mounted in said handle, said shaft being provided with a serpentine way in the periphery thereof and a reduced outer end, a finger bar, a sleeve formed on said finger bar, a yoke member disposed rearwardly from said finger bar and having an opening therein alining with the opening in said sleeve, a second sleeve fixedly mounted on said reduced end, a segment formed on the outer periphery of said sleeve, teeth formed on said segment, a cutter bar provided with slots in proximity to the opposite ends thereof, said cutter bar mounted for oscillation on said finger bar, a set screw extending through said sleeve and having engagement with said finger bar for limiting the movement of said cutter bar, the rear end of said cutter bar being extended, a rack bar formed on said extended end adapted for meshing engagement with the teeth of said segment, an elongated sleeve slidably mounted on said shaft, a stud formed on the inner periphery of said sleeve for engagement in said groove whereby to rotate said shaft for imparting movement to said cutter bar, and a handhold arranged on said sleeve for facilitating the operation of the latter.

In testimony whereof I affix my signature in presence of two witnesses.

ANDREW McNISH.

Witnesses:
HARRY H. TUTHILL,
GORDON H. BRAND.